United States Patent [19]

Pflugfelder

[11] 4,382,532
[45] May 10, 1983

[54] FASTENING DEVICE FOR A ROOF RACK FOR LUGGAGE

[75] Inventor: Karl Pflugfelder, Neckarsulm, Fed. Rep. of Germany

[73] Assignee: Audi NSU Auto Union Aktiengesellschaft, Fed. Rep. of Germany

[21] Appl. No.: 229,140

[22] Filed: Jan. 28, 1981

[30] Foreign Application Priority Data

Feb. 9, 1980 [DE] Fed. Rep. of Germany ....... 3004919

[51] Int. Cl.³ .................................................. B60R 9/04
[52] U.S. Cl. ....................................... 224/331; 224/329
[58] Field of Search ................. 224/314, 315, 321–331

[56] References Cited

U.S. PATENT DOCUMENTS 3,622,057 11/1971 Marker ................................ 224/331

FOREIGN PATENT DOCUMENTS

| 2551646 | 6/1977 | Fed. Rep. of Germany ...... 224/331 |
| 996978 | 12/1951 | France ................. 224/331 |
| 1022149 | 2/1953 | France ................. 224/331 |
| 1033967 | 7/1953 | France ................. 224/331 |
| 1282675 | 12/1961 | France ................. 224/331 |

Primary Examiner—William Price
Assistant Examiner—Gary E. Elkins
Attorney, Agent, or Firm—Kane, Dalsimer, Kane, Sullivan and Kurucz

[57] ABSTRACT

This invention provides a fastening device for roof racks which is clamped only on one side of a car. The fastening comprises a support bar 10, a rigid leg 12 which embraces one of the lateral rails 2 which make up the roof of the car and a second leg 13 which is adjustably attached to the other lateral rail.

3 Claims, 5 Drawing Figures

FASTENING DEVICE FOR A ROOF RACK FOR LUGGAGE

This invention refers to a fastening device for a roof rack or holder for motor vehicles as is common for transportation of luggage, skis and the like. Normally such racks or holders comprise supporting bars which carry the load and extend transversely over the roof and which are provided at their ends with supporting legs which rest in the rain gutter of the vehicle roof and are clamped to the roof by means of fastening devices which embrace the rain gutter and are secured by tightening screws. Such racks are relatively complex in design and its mounting is troublesome. Furthermore such racks cannot be attached at all to roofs which have no rain gutter.

It is an object of the invention to provide a fastening device for a roof rack which is of simple design, which can be easily attached to a vehicle roof and which can be used also with roofs which have no rain gutter.

It is a further object of the invention to provide a roof rack which need to be fastened from only one side of the vehicle.

It is another object of the invention to provide a roof rack which has only half the number of fastening means than the known racks.

Other objects and advantages of the invention will become apparent from the following description in conjunction with the attached drawings.

Figure 1:
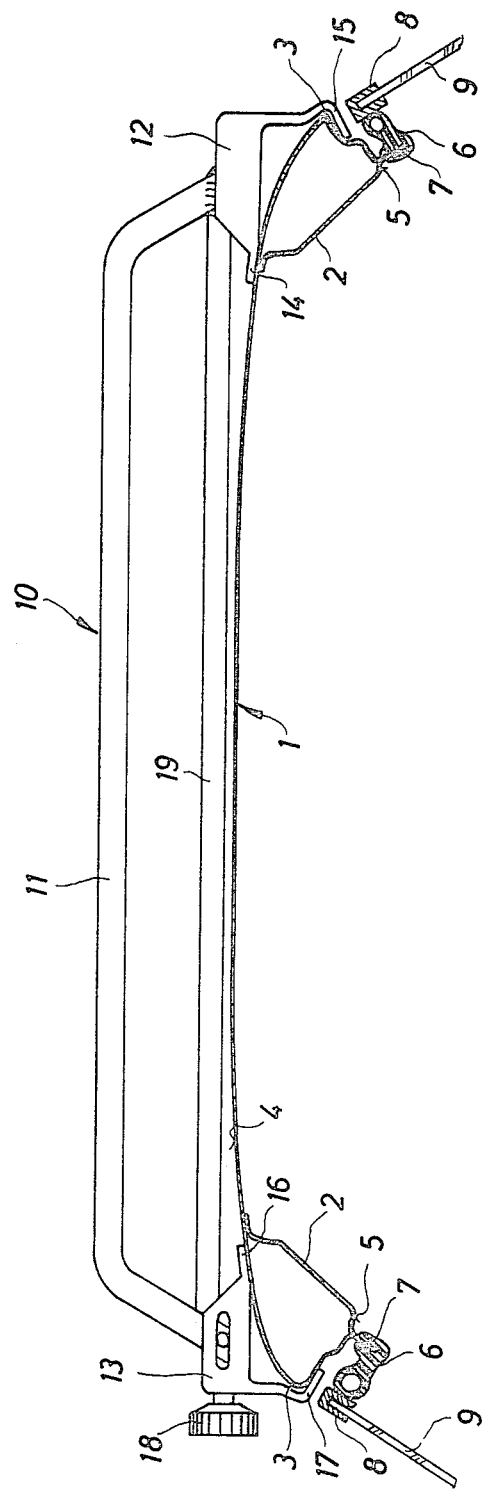
Figure 2:
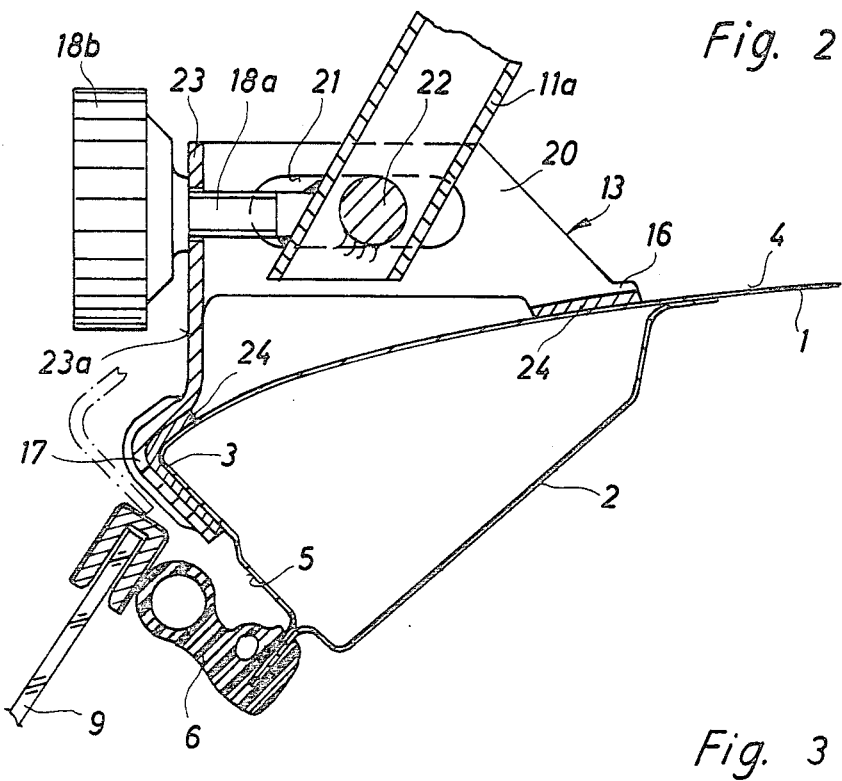
Figure 3:
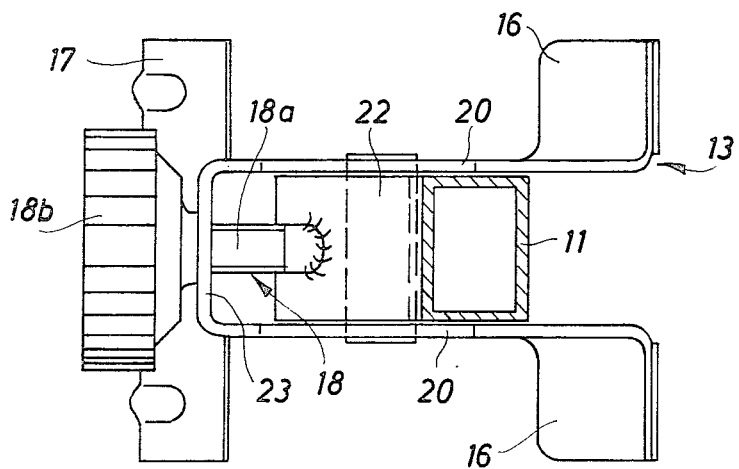
Figure 4:
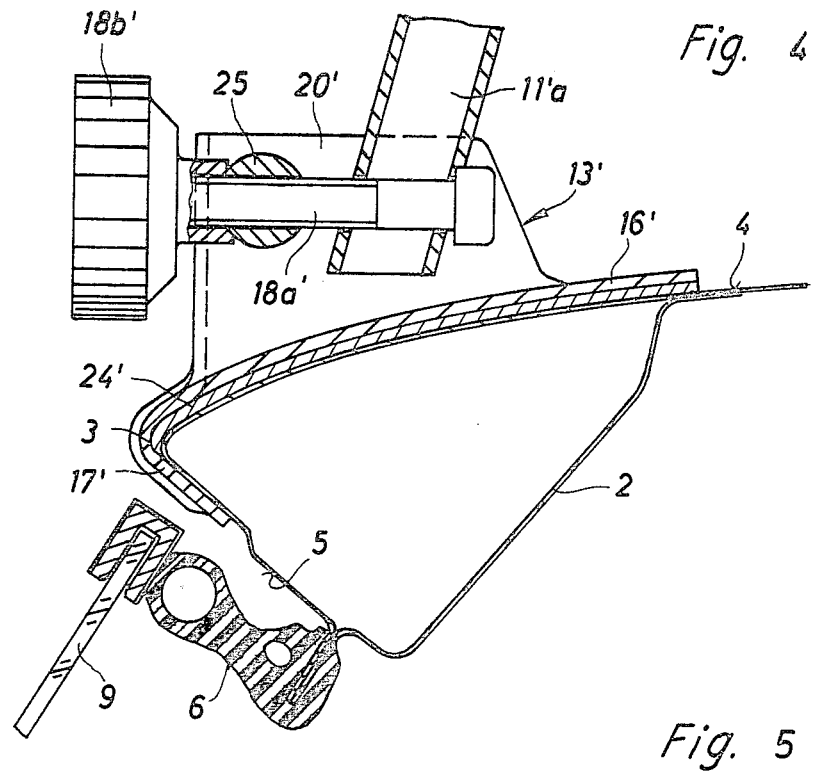
Figure 5:
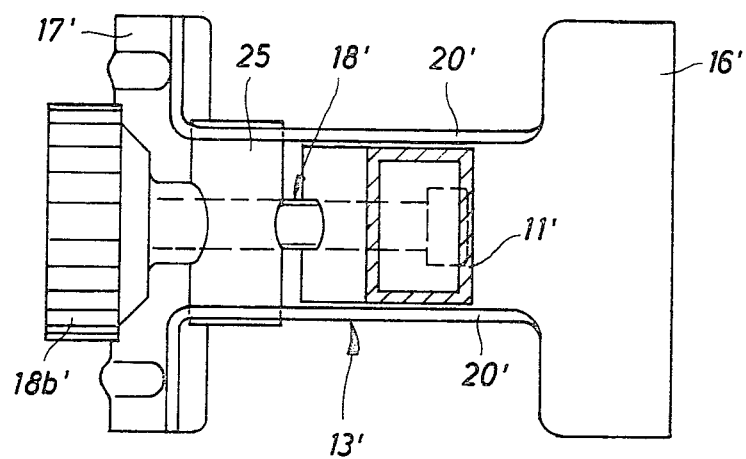

FIG. 1 is a cross sectional view of a vehicle roof with a roof rack attached to the roof by a fastening device according to the invention, FIG. 2 is a first embodiment of a fastening device according to the invention in an enlarged scale, partly in section, FIG. 3 is a plan view of the fastening device according to FIG. 2, FIG. 4 is a second embodiment of a fastening device similar to FIG. 2, and, FIG. 5 is a plan view of the fastening device of FIG. 4.

In FIG. 1 there is shown the roof 1 of a motor vehicle in section. The roof 1 comprises lateral roof rails 2 which are sloping downwardly from the lateral outer rim 3 of the roof surface 4 to a door opening 5 and therefrom are sloping upwardly and inwardly. A seal strip 6 is arranged in the door opening 5 and is slipped on a fold 7 of the roof rail 2 to make sealing contact with the door frame 8 of a vehicle door or window 9. This design conforms in principle to the contour of a vehicle roof with which an outer rain gutter has been omitted in order to decrease the air resistance.

Upon the roof 1 there is arranged a roof rack 10 for luggage or ski comprising at least two support bars 11 (only one being shown) which rest on the roof surface 4 near the roof rails 2 by means of support legs 12 and 13. The right-hand support leg 12 is provided with an essentially horizontal lug 14 which rests on the roof surface 4, and a downwardly extending projection 15 which embraces the outer rim 3 of the roof. The left-hand support leg 13 is likewise provided with a lug 16 which rests on the roof surface 4, and with a downwardly extending projection 17 for embracing the left-hand outer rim 3. The lugs 14 and 16 and the projections 15 and 17 are accommodated to the contour of the roof rail 2 and the roof surface 4, respectively. The right-hand support leg 12 is rigidly connected to the bar 11 whereas the left-hand support leg 13 is adjustable with respect to the bar 11 and is formed as a fastening device. To this end a tightening screw 18 is arranged between the leg 13 and the bar 11, said screw being arranged horizontally and abuts on one hand on the leg 13 and is connected on the other hand to the bar 11. By tightening screw 18 the bar 11 is tensioned owing to the fact that its other end is anchored by support leg 12 on the right-hand rim 3 of roof 1.

With this arrangement a simplified mounting is effected owing to the fact that the rack 10 is brought to rest with its right-hand support leg(s) 12 on the right-hand roof rail 2 and then only the tightening screw(s) 18 of the left-hand support leg(s) 13 need to be tightened. In order to prevent that the bar 11 is deformed by the tensioning force exerted by screw 18 a strut 19 is arranged between the ends of the bars 11, said strut taking up the clamping force between the supporting legs 12 and 13.

FIGS. 2 and 3 shows the fastening device of FIG. 1 partly in section. In this embodiment the supporting leg 13 comprises two parallel vertical guide walls 20 between which the end 11a of the bar 11 is laterally guided. The bar 11 is furthermore guided by a pin 22 in two horizontal slots 21 arranged in the guide walls 20. The guide pin 22 is connected to the end 11a of bar 11 and is movable in the slots 21. The tightening screw 18 comprises a threaded pin 18a which is connected to the bar 11 in the plane of guide pin 22 and extends horizontally and parallel to the guide walls 20, and a nut 18b. The threaded pin 18a extends through a web 23 which interconnects the guide walls 20. The nut 18b abuts against the outer surface 23a of web 23. The bar 11 is clamped in place or loosened by turning screw 18b. For dismounting the bar 11 the screw 18b must be loosened to such extent until the projection 17 is free from the outer rim 3 of the roof—as is shown in phantom lines—and the leg 13 can be lifted together with the bar 11. In order to prevent damage of the roof skin underlayers 24 are arranged between the legs 12, 13 and the roof surface 4. The load exerted on bar 11 is transmitted via the guide pin 22 and the guide walls 20 directly to the support leg 13 and therefrom to the roof rail 2.

In the embodiment of FIGS. 4 and 5 the same reference numerals, but with a dash, have been used for like or similar parts as in FIGS. 2 and 3. The support leg 13, shown partly in section, comprises two parallel vertical guide walls 20' between which the end 11a' of bar 11' is supported laterally. A screw 18a' which is arranged horizontally and in parallel to the guide walls 20' extends through the end 11a' with its head resting on the bar 11' as can be seen from FIG. 4. The screw 18a' projects through a cross bar 25 which is provided between and attached to the guide walls 20'. A tightening nut 18b' screwed on screw 18a' abuts the cross bar 25. The fastening and loosening of the bar 11' is effected by corresponding turning of nut 18b'. Also in this embodiment an underlayer 24' is provided between the supporting legs and the roof surface 4 in order to prevent a damage of the latter.

The load exerted upon the bar 11' is transmitted via the screw 18a' and the cross bar 25 to the guide walls 20' of leg 13' and is taken up by the roof rail 2.

It will be appreciated that the fastening of the rack to the vehicle roof is performed on one side only of the vehicle i.e. at the side where the nuts 18b and 18b', resp., are arranged as the legs at the ends of the bar on the other side are only hooked on to the roof rim 3. This facilitates the mounting of the rack. Besides this manufacture is cheaper as there is only one movable and adjustable fastening means for each bar.

Naturally the roof rack according to the invention can be used in principle also with vehicles having rain gutters. In that case the shape of the projections 15, 17 should be amended accordingly.

What I claim is:

1. A fastening device for a roof rack for luggage, skis and the like, comprising supporting bars which take up the load and which are provided at their ends with supporting legs which can be clamped to the lateral roof rails, said legs being designed to rest upon the roof upper surface close to the lateral roof rails and to embrace the lateral roof rails, one leg of each bar being rigidly and the other leg being adjustably attached to the bar such that the bar can be clamped between the lateral roof rails by fastening the adjustable leg, the adjustable leg comprising a guide supporting the respective leg of the bar for horizontal movement, and a tightening screw arranged parallel to the guide and engaging said end and abutting against the leg.

2. A fastening device according to claim 1, wherein the guide is formed by two parallel vertical guide parts of the leg, and the end of the leg is guided laterally between said guide parts, and wherein the abutment of the screw against the leg is formed by a web between the guide parts through which the screw extends.

3. A fastening device according to claim 1, wherein the guide is formed of two slots which are arranged in two vertical and parallel guide parts of the leg, a bolt fastened to the end of the bar and extending transverse to the direction of adjustment of the bar and being slidable in said slots, the screw extending through a web interconnecting said guide parts and serving as an abutment for the screw.

* * * * *